(12) United States Patent
Leong et al.

(10) Patent No.: US 7,886,976 B2
(45) Date of Patent: Feb. 15, 2011

(54) ELECTROMAGNETIC FIELD INDUCED MSR SWIPES DETECTION

(75) Inventors: Winston Can Wain Leong, Roseville, CA (US); Kevin Richard Starinieri, Rocklin, CA (US); Paul A. Serotta, Roseville, CA (US); Michael Pedigo, Rocklin, CA (US)

(73) Assignee: Verifone, Inc., San Jose, CA (US)

( * ) Notice: Subject to any disclaimer, the term of this patent is extended or adjusted under 35 U.S.C. 154(b) by 529 days.

(21) Appl. No.: 11/965,957

(22) Filed: Dec. 28, 2007

(65) Prior Publication Data

US 2009/0078765 A1   Mar. 26, 2009

Related U.S. Application Data

(60) Provisional application No. 60/994,951, filed on Sep. 20, 2007.

(51) Int. Cl.
*G06K 7/08* (2006.01)

(52) U.S. Cl. .............. 235/449; 235/375; 235/380; 235/493

(58) Field of Classification Search .............. 235/375, 235/380, 449, 493
See application file for complete search history.

(56) References Cited

U.S. PATENT DOCUMENTS

| | | | |
|---|---|---|---|
| 3,508,031 A | 4/1970 | Cooper, Jr. | |
| 4,849,616 A * | 7/1989 | Mizote | 235/449 |
| 5,204,513 A * | 4/1993 | Steele | 235/449 |
| 5,285,328 A * | 2/1994 | Behr et al. | 360/53 |
| 6,254,005 B1 | 7/2001 | Smith et al. | |
| 6,830,182 B2 * | 12/2004 | Izuyama | 235/449 |
| 6,853,093 B2 | 2/2005 | Cohen et al. | |
| 7,185,806 B2 * | 3/2007 | Sines | 235/380 |
| 7,309,012 B2 * | 12/2007 | von Mueller et al. | 235/449 |
| 7,451,923 B2 * | 11/2008 | Sines | 235/380 |
| 7,552,865 B2 * | 6/2009 | Varadarajan et al. | 235/379 |
| 2002/0032657 A1 * | 3/2002 | Singh | 705/44 |
| 2005/0219728 A1 * | 10/2005 | Durbin et al. | 360/46 |
| 2005/0234715 A1 | 10/2005 | Ozawa | |
| 2006/0032906 A1 * | 2/2006 | Sines | 235/380 |
| 2007/0090181 A1 * | 4/2007 | Varadarajan et al. | 235/380 |
| 2007/0152052 A1 * | 7/2007 | Sines | 235/449 |

FOREIGN PATENT DOCUMENTS

| | | |
|---|---|---|
| EP | 0565759 | 10/1993 |
| JP | 57127967 | 8/1982 |
| JP | 58009257 | 1/1983 |

(Continued)

OTHER PUBLICATIONS

U.S. Appl. No. 60/994,951, filed Sep. 20, 2007.

(Continued)

*Primary Examiner*—Daniel A Hess
*Assistant Examiner*—Paultep Savusdiphol
(74) *Attorney, Agent, or Firm*—Fish & Richardson P.C.

(57) ABSTRACT

A payment terminal including a magnetic card reader, a decoder receiving analog signals from the magnetic card reader and providing a digital data output to utilization circuitry and data integrity assurance circuitry operative to eliminate spurious data due to Electromagnetic Field (EMF) interference.

20 Claims, 3 Drawing Sheets

FOREIGN PATENT DOCUMENTS

| | | |
|---|---|---|
| JP | 60170068 | 9/1985 |
| JP | 62102492 | 5/1987 |
| JP | 2126385 | 5/1990 |
| JP | 2126386 | 5/1990 |
| JP | 3012060 | 1/1991 |
| JP | 3251976 | 11/1991 |
| JP | 5266318 | 10/1993 |
| JP | 6146677 | 5/1994 |
| JP | 8335253 | 12/1996 |

OTHER PUBLICATIONS

U.S. Appl. No. 11/636,369, filed Dec. 8, 2006.
U.S. Appl. No. 11/627,166, filed Jan. 25, 2007.
U.S. Appl. No. 11/766,457, filed Jun. 21, 2007.
U.S. Appl. No. 11/856,460, filed Sep. 17, 2007.

* cited by examiner

ELECTROMAGNETIC FIELD INDUCED MSR SWIPES DETECTION

REFERENCE TO RELATED APPLICATIONS

Reference is made to U.S. Provisional Patent Application Ser. No. 60/994,951, filed Sep. 20, 2007 and entitled "Electromagnetic Field Induced MSR Swipes Detection," the disclosure of which is hereby incorporated by reference and priority of which is hereby claimed pursuant to 37 CFR 1.78 (a) (4) and (5)(i).

FIELD OF THE INVENTION

The present invention relates to payment devices employing magnetic card readers.

BACKGROUND OF THE INVENTION

Magnetic card readers are employed widely in various applications, including payment devices, including, for example, POS terminals, electronic cash registers and ATMs. Traditionally, there has been a concern with data integrity of such devices.

SUMMARY OF THE INVENTION

The present invention seeks to provide improved payment devices including such magnetic card readers.

There is thus provided in accordance with a preferred embodiment of the present invention a payment terminal including a magnetic card reader, a decoder receiving analog signals from the magnetic card reader and providing a digital data output to utilization circuitry and data integrity assurance circuitry operative to eliminate spurious data due to Electromagnetic Field (EMF) interference.

Preferably, the data integrity assurance circuitry includes data integrity verification circuitry receiving the digital data output from the decoder, verifying the integrity of the data output and providing a verified data output to the utilization circuitry.

Preferably, the data integrity assurance circuitry is embodied in a processor employed in an operating system of the payment terminal.

There is also provided in accordance with another preferred embodiment of the present invention a method of operating a payment terminal including a magnetic card reader and a decoder, receiving analog signals from the magnetic card reader and providing a digital data output to utilization circuitry, the method including at least generally preventing spurious data due to Electromagnetic Field (EMF) interference from reaching the utilization circuitry.

There is further provided in accordance with still another preferred embodiment of the present invention a method of operating a payment terminal including a magnetic card reader and a decoder, receiving analog signals from the magnetic card reader and providing a digital data output, the method including receiving the digital data output, verifying the integrity of the data output and providing a verified data output to utilization circuitry, thereby to eliminate spurious data due to Electromagnetic Field (EMF) interference.

Preferably, the verifying employs a processor also employed in an operating system of the payment terminal. Additionally or alternatively, the verifying is carried out by software including at least one algorithm which rejects digital data having predetermined characteristics.

Preferably, the software is operative for detecting false swipe reports based both on the frequency of the reports and the content thereof. Additionally, the software operative for detecting false swipe reports includes at least one of the following detection criteria: a. there are more than three card swipe reports within approximately 70 ms, b. more than a predetermined number of consecutive card swipe reports are considered not to contain any data; inasmuch as they either provide data having less than three characters on each of the three tracks or have an initial 0 and c. a card swipe report indicates no data on each of the three tracks and the preceding card swipe report fulfilled either of criteria a or b above.

There is even further provided in accordance with yet another preferred embodiment of the present invention a payment terminal including a magnetic card reader, a decoder receiving analog signals from the magnetic card reader and providing a digital data output, at least one magnetic card presence sensor and card presence responsive data integrity verification circuitry responsive to the presence or absence of an output from the at least one magnetic card presence sensor for confirming the occurrence of a card swipe and being operative to eliminate spurious data in the absence of a sensed card swipe occurrence.

Preferably, the card presence responsive data integrity verification circuitry is operative to disable operation of the decoder in the absence of a sensed card swipe occurrence. Preferably, the at least one magnetic card presence sensor includes at least one optical sensor disposed at at least one end of a card swipe pathway defined in the magnetic card reader and wherein the card presence responsive data integrity verification circuitry is operative to enable operation of the decoder only when at least one of the at least one optical sensor senses presence of a card.

Preferably, the at least one magnetic card presence sensor includes a pair of optical sensors disposed at opposite ends of a card swipe pathway defined in the magnetic card reader and wherein the card presence responsive data integrity verification circuitry is operative to enable operation of the decoder only when at least one of the pair of optical sensors senses presence of a card.

Preferably, the payment terminal also includes data integrity assurance circuitry including software operative to eliminate spurious data due to EMF interference. Additionally, the data integrity assurance circuitry is embodied in a processor employed in an operating system of the payment terminal.

Preferably, the payment terminal also includes data integrity verification circuitry including software including at least one algorithm which rejects digital data having predetermined characteristics. Additionally, the software including at least one algorithm which rejects digital data having predetermined characteristics includes software operative for detecting false swipe reports based both on the frequency of the reports and the content thereof. Additionally, the software operative for detecting false swipe reports includes at least one of the following detection criteria: a. there are more than three card swipe reports within approximately 70 ms, b. more than a predetermined number of consecutive card swipe reports are considered not to contain any data, inasmuch as they either provide data having less than three characters on each of the three tracks or have an initial 0 and c. a card swipe report indicates no data on each of the three tracks and the preceding card swipe report fulfilled either of criteria a or b above.

There is yet further provided in accordance with another preferred embodiment of the present invention a payment terminal including a magnetic card reader, a decoder receiving analog signals from the magnetic card reader and providing a digital data output to utilization circuitry and data integrity assurance circuitry including software operative to eliminate spurious data due to Electromagnetic Field (EMF) interference.

Preferably, the data integrity assurance circuitry is embodied in a processor employed in an operating system of the payment terminal.

Preferably, the data integrity assurance circuitry includes data integrity verification circuitry receiving the digital data output from the decoder, verifying the integrity of the data output and providing a verified data output to the utilization circuitry. Additionally, the data integrity verification circuitry includes software including at least one algorithm which rejects digital data having predetermined characteristics.

Preferably, the software in the data integrity verification circuitry includes software operative for detecting false swipe reports based both on the frequency of the reports and the content thereof. Additionally, the software operative for detecting false swipe reports includes at least one of the following detection criteria: a. there are more than three card swipe reports within approximately 70 ms, b. more than a predetermined number of consecutive card swipe reports are considered not to contain any data; inasmuch as they either provide data having less than three characters on each of the three tracks or have an initial 0 and c. a card swipe report indicates no data on each of the three tracks and the preceding card swipe report fulfilled either of criteria a or b above.

There is also provided in accordance with still another preferred embodiment of the present invention a method of operating a payment terminal including a magnetic card reader and a decoder, receiving analog signals from the magnetic card reader and providing a digital data output to utilization circuitry, the method including employing software to at least generally prevent spurious data due to Electromagnetic Field (EMF) interference from reaching the utilization circuitry.

There is further provided in accordance with yet another preferred embodiment of the present invention a method of operating a payment terminal including a magnetic card reader and a decoder, receiving analog signals from the magnetic card reader and providing a digital data output, the method including receiving the digital data output, and employing software for verifying the integrity of the data output and providing a verified data output to utilization circuitry, thereby to eliminate spurious data due to Electromagnetic Field (EMF) interference.

Preferably, the verifying employs a processor also employed in an operating system of the payment terminal. Preferably, the software for verifying includes at least one algorithm which rejects digital data having predetermined characteristics. Additionally, the software for verifying is operative to detect false swipe reports based both on the frequency of the reports and the content thereof. Additionally, the software for verifying includes at least one of the following detection criteria: a. there are more than three card swipe reports within approximately 70 ms, b. more than a predetermined number of consecutive card swipe reports are considered not to contain any data; inasmuch as they either provide data having less than three characters on each of the three tracks or have an initial 0 and c. a card swipe report indicates no data on each of the three tracks and the preceding card swipe report fulfilled either of criteria a or b above.

There is still further provided in accordance with another preferred embodiment of the present invention a method of operating a payment terminal including a magnetic card reader, a decoder receiving analog signals from the magnetic card reader and providing a digital data output, at least one magnetic card presence sensor and card presence responsive data integrity verification circuitry responsive to the presence or absence of an output from the at least one magnetic card presence sensor for confirming the occurrence of a card swipe and being operative to eliminate spurious data in the absence of a sensed card swipe occurrence, the method including employing software to at least generally prevent spurious data due to Electromagnetic Field (EMF) interference from reaching utilization circuitry.

Preferably, the software includes at least one of the following detection criteria for false swipes: a. there are more than three card swipe reports within approximately 70 ms, b. more than a predetermined number of consecutive card swipe reports are considered not to contain any data; inasmuch as they either provide data having less than three characters on each of the three tracks or have an initial 0 and c. a card swipe report indicates no data on each of the three tracks and the preceding card swipe report fulfilled either of criteria a or b above.

There is yet further provided in accordance with yet another preferred embodiment of the present invention a method of operating a payment terminal including a magnetic card reader, a decoder receiving analog signals from the magnetic card reader and providing a digital data output, at least one magnetic card presence sensor and card presence responsive data integrity verification circuitry responsive to the presence or absence of an output from the at least one magnetic card presence sensor for confirming the occurrence of a card swipe and being operative to eliminate spurious data in the absence of a sensed card swipe occurrence, the method including receiving the digital data output, and employing software for verifying the integrity of the data output and providing a verified data output to utilization circuitry, thereby to eliminate spurious data due to Electromagnetic Field (EMF) interference.

Preferably, the verifying employs a processor also employed in an operating system of the payment terminal.

Preferably, the software includes at least one algorithm which rejects digital data having predetermined characteristics. Additionally, the software is operative for detecting false swipe reports based both on the frequency of the reports and the content thereof. Additionally, the software includes at least one of the following detection criteria for false swipes: a. there are more than three card swipe reports within approximately 70 ms; b. more than a predetermined number of consecutive card swipe reports are considered not to contain any data; inasmuch as they either provide data having less than three characters on each of the three tracks or have an initial 0 and c. a card swipe report indicates no data on each of the three tracks and the preceding card swipe report fulfilled either of criteria a or b above.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
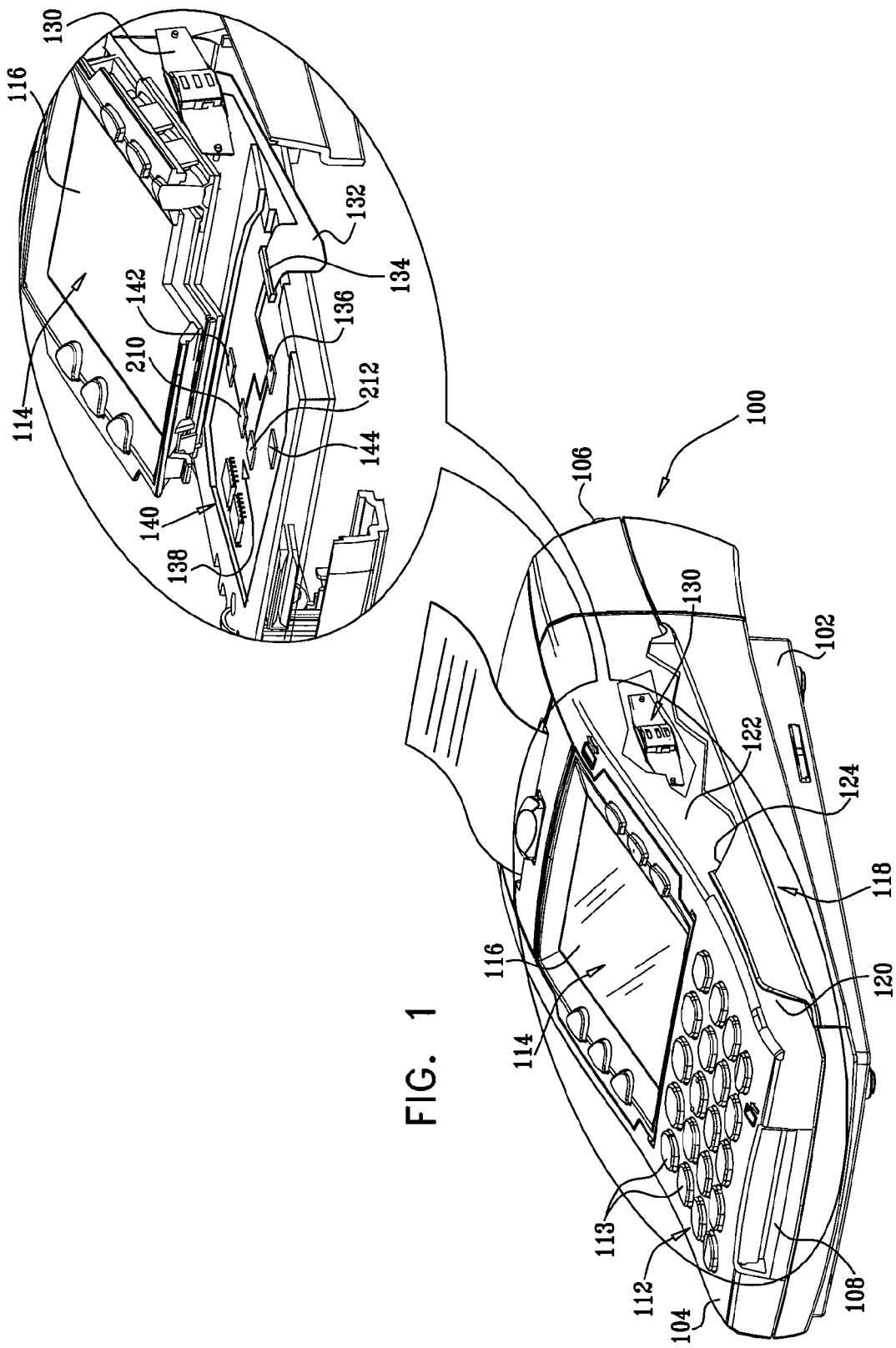
FIG. 1 is a simplified illustration of a payment terminal constructed and operative in accordance with a preferred embodiment of the present invention.

Reference is now made to FIG. 1, which illustrates a payment terminal constructed and operative in accordance with a preferred embodiment of the present invention. As seen in FIG. 1, the payment terminal may be generally similar in structure and function to a conventional payment terminal, such as a payment terminal belonging to the MX 800 series, commercially available from Verifone, Inc. It is appreciated that the present invention is not limited in its application to a given type or model of payment terminal but is applicable to magnetic stripe reading devices useful in any suitable payment device. Such a payment device may include, for example, a check reader, a card-based payment terminal, an electronic cash register, a PIN pad, an automatic teller machine (ATM), an automated kiosk and an electronic vending machine. The present invention may be particularly useful in wireless payment devices but is not limited thereto.

As seen in FIG. 1, the payment terminal preferably includes a housing 100 including a base portion 102 and a top portion 104, which are typically snap-fitted together. In the illustrated embodiment, the housing also includes a printer housing portion 106. The top portion 104 of housing 100 preferably defines a smart-card insertion slot 108, which communicates with a smart-card reader (not shown) located within the housing. The top portion 104 of the housing 100 also defines a keypad array location 112 wherein an array of keys 113 are located, and a display location 114, where a display, such as an LCD display 116, is located. Additionally, the top portion 104 of housing 100 preferably defines a magnetic card reader assembly 118, which includes a slot 120 having spaced surfaces 122 and 124. A magnetic head assembly 130 is mounted on surface 122, typically on an inside wall of surface 122.

An output of magnetic head assembly 130 preferably is supplied via a cable 132 and a connector 134 to a decoder 136, having associated therewith data integrity assurance circuitry 138. Connector 134, decoder 136 and data integrity assurance circuitry 138 are preferably all enclosed within a protected enclosure 140, such as that described in U.S. Pat. No. 6,853, 093, the disclosure of which is hereby incorporated by reference. Preferably utilization circuitry 142, which, inter alia, receives data via decoder 136, is also enclosed within protected enclosure 140.

In accordance with a preferred embodiment of the invention, the magnetic card reader assembly 118, cable 132 and connector 134 may be constructed and operative in accordance with one or more of assignee's U.S. Patent Applications U.S. Ser. No. 11/636,369, filed on Dec. 8, 2006; U.S. Ser. No. 11/627,166, filed on Jan. 25, 2007; U.S. Ser. No. 11/766,457, filed on Jun. 21, 2007 and U.S. Ser. No. 11/856, 460, filed on Sep. 17, 2007, the disclosures of which are hereby incorporated by reference.

Figure 2:
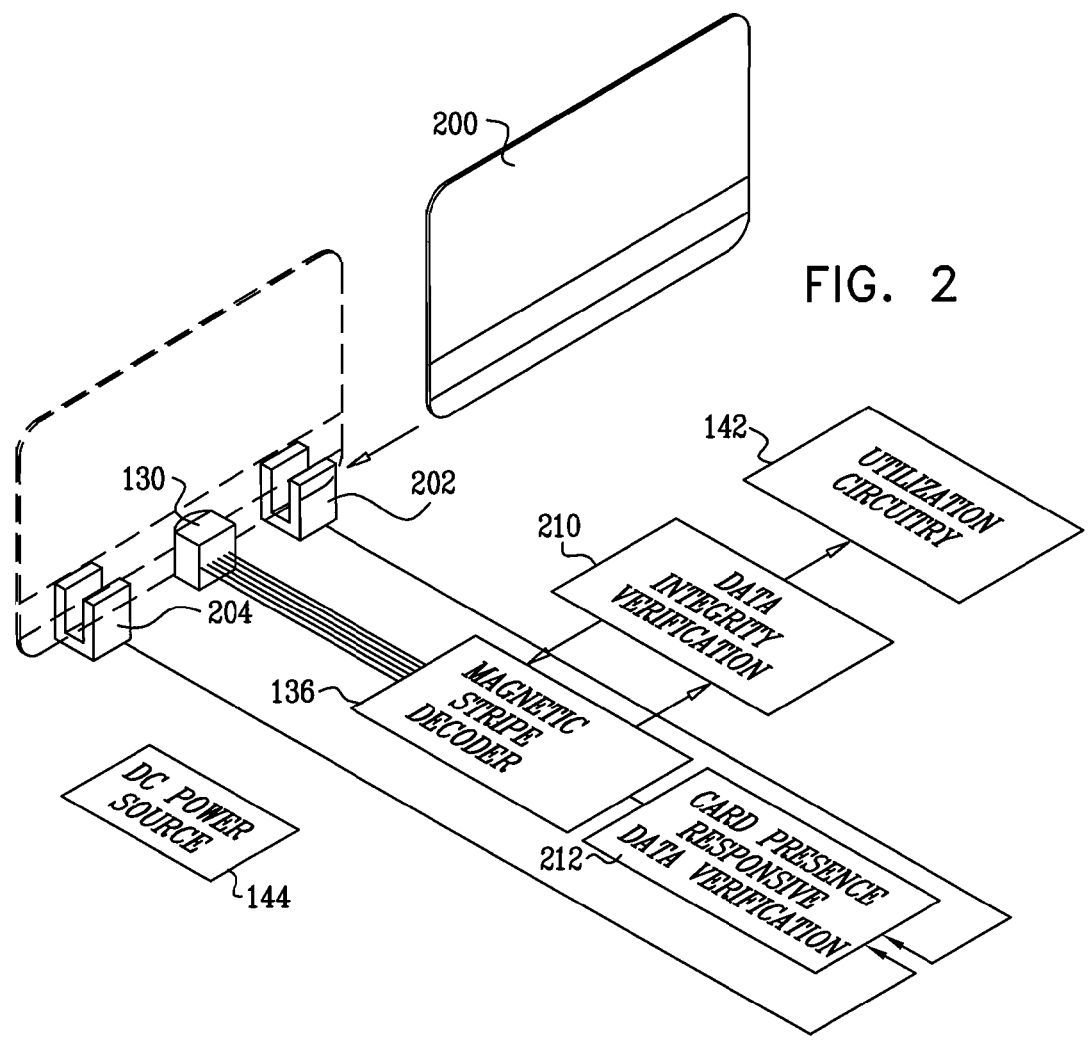
FIG. 2 is a simplified partially pictorial, partially schematic illustration of a portion of the payment terminal constructed and operative in accordance with a preferred embodiment of the present invention.

Reference is now made to FIG. 2, which is a simplified partially pictorial, partially schematic illustration of a portion of the payment terminal constructed and operative in accordance with a preferred embodiment of the present invention. As seen in FIG. 2, magnetic head assembly 130 reads information on a magnetic card 200, whose presence at or propinquity to magnetic head assembly 130 is sensed by one or both of card presence sensors 202 and 204, preferably phototransistors.

Decoder 136 receives analog signals from magnetic head assembly 130 and provides a digital data output.

In accordance with a preferred embodiment of the present invention, data integrity assurance circuitry 138 is provided in order to eliminate spurious digital data due to Electromagnetic Field (EMF) interference.

In accordance with a first embodiment of the present invention, the data integrity assurance circuitry 138 includes data integrity verification circuitry 210 which receives the data output of decoder 136, verifies the integrity of that data and provides a verified data output to utilization circuitry 142. In this embodiment, the data integrity verification circuitry 210 is embodied in software, preferably residing in an operating system of the payment terminal, within the protected enclosure 140 (FIG. 1). The software may reside, for example, in a dedicated integrated circuit, in the main processor of the payment terminal or in any other suitable location.

In accordance with a second embodiment of the present invention, which may or may not be provided together with the first embodiment of the invention described in the preceding paragraph, data integrity assurance circuitry 138 comprises card presence responsive data verification circuitry 212. Card presence responsive data verification circuitry 212 preferably receives a card presence indication from one or both card presence sensors 202 and 204 when magnetic card 200 is in predetermined propinquity to the magnetic head assembly 130. In this embodiment, the card presence responsive data verification circuitry 212 controls the operation of the decoder 136 to eliminate decoding of the data by decoder 136 other than when there is a card presence indication, thus eliminating data outputs from the decoder 136 at times when a card is not being swiped. In this way, an enhanced integrity digital data output is provided to utilization circuitry 142 responsive to the card presence indication, with substantially reduced spurious data due to EMF interference. A specific implementation of this embodiment is shown in FIG. 3.

It is appreciated that either one or both of the above-described embodiments may be incorporated in a given payment terminal.

A DC power source 144 provides electrical power for the various active elements in the circuitry of FIG. 2.

Figure 3:
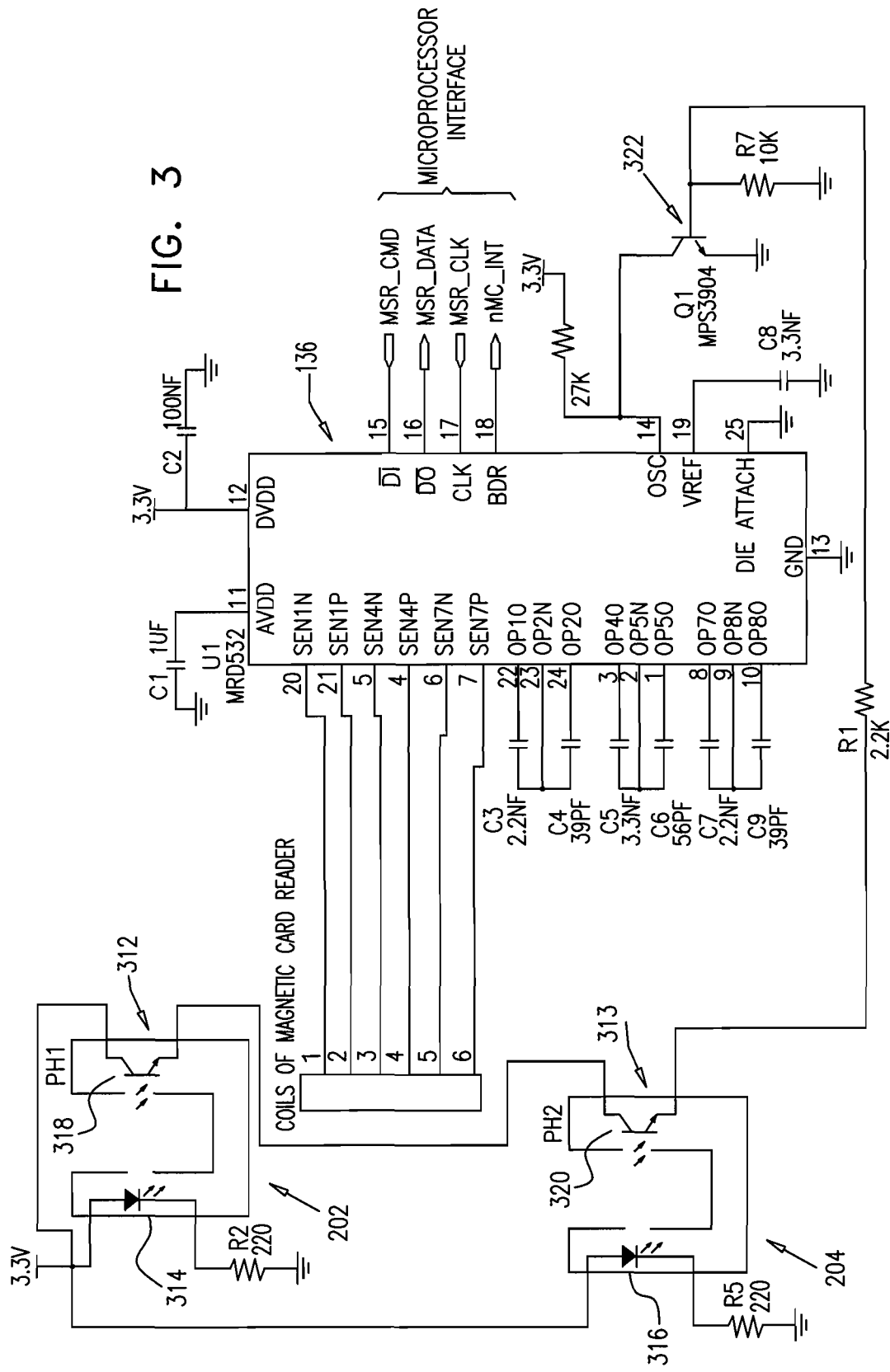
FIG. 3 is a simplified schematic illustration of circuitry employed in one preferred embodiment of the payment terminal of FIGS. 1 and 2.

Turning to FIG. 3, it is seen that card presence sensors 202 and 204 are embodied in series-connected photo-sensor assemblies 312 and 313, respectively, and include respective LEDS 314 and 316 and corresponding phototransistors 318 and 320. Alternatively, suitable mechanical switches may be employed for card presence sensors 202 and 204. The output of photo-sensor assembly 313 provides an input to a transistor 322. The output of transistor 322 provides on/off gating control of an OSC input (pin 14) of decoder 136, preferably a UIC Triple Track F2F Decoder, identified by part designator MRD532A, commercially available from Uniform Industrial Corp. of Taipei Hsien, Taiwan.

The photosensor assemblies 312 and 313 respond to the presence of card 200 (FIG. 2) when it is inserted between LEDs 314 and 316 and corresponding phototransistors 318 and 320. Electrical power for the LEDs 314 and 316 and the phototransistors 318 and 320 is provided by DC power source 144 (FIG. 2) which also supplies power, as appropriate, to other components and circuits.

Shorting pin 14 of decoder 136 to ground disables the decoder 136 and inhibits any undesired response to EMF interference, which may come from an internal wireless transmitter or some other internal or external interfering source.

When a card 200 is not sensed by either or both of photo-sensor assemblies 312 and 313, the OSC input (pin 14) of decoder 136 is shortened to ground, thus deactivating decoder 136.

Pins 20, 21 and 4-7 of decoder 136 are connected to corresponding terminals of three separate magnetic pick-up coils forming part of the magnetic head assembly 130 (FIG. 1). Pins 15-18 of decoder 136 are arranged to be coupled to utilization circuitry 142 (FIG. 1) in the payment device, such as a microprocessor (not shown).

It is appreciated that aside from the specific implementation for eliminating EMF interference other implementations are also possible. Alternatively, decoder 136 may also include an initialization pin, which could be suitably controlled to effect elimination or reduction of EMF interference.

The operation of data integrity verification circuitry 210 which, as noted above, receives the data output of decoder 136, verifies the integrity of that data and provides a verified data output to utilization circuitry 142 (FIG. 1) is described hereinbelow.

Analog signals from magnetic head 130 (FIG. 2) are received by decoder 136 which converts them to three tracks of digital data, stores the digital data in an internal buffer and then clocks out the data bits. When a payment terminal is located in a relatively strong magnetic field producing EMF interference, such as near a SENSORMATIC® deactivator, magnetic head 130 may receive EMF interference and may cause the decoder 136 to provide a false report of a card swipe to utilization circuitry 142 (FIG. 1) in the payment device, such as a microprocessor (not shown). Such false reports may occur frequently due to EMF interference and result in substantial inconsistency in the correctness of the data supplied to the utilization circuitry 142.

Accordingly, the false reports supplied to the utilization circuitry 142 may indicate, for example, that all three tracks of a swiped card have no data or a very small amount of data, that some or all tracks of a swiped card contain nearly all 1's or nearly all 0's and/or that the initial bit read out for each track by the decoder 136 is a zero instead of a 1 and thus constitutes an invalid data stream, since the decoder is designed to strip off all initial zeros. The presence of an initial zero indicates EMF interference in decoder function.

The present invention detects such false reports which result from EMF interference by considering both the frequency of card swipe reports and the contents thereof. To ensure that reports of actual card swipes are not ignored or considered to result from EMF interference, the following three criteria for classifying a card swipe report as a false card swipe report resulting, inter alia, from EMF interference are preferred:

1) There are more than three card swipe reports within approximately 70 ms; or

2) More than a predetermined number of consecutive card swipe reports (typically 3) are considered not to contain any data, inasmuch as they either provide data having less than three characters on each of the three tracks or have an initial 0; or 3) A card swipe report indicates no data on each of the three tracks and the preceding card swipe report fulfilled either of criteria 1 or 2 above.

It will be appreciated that the present invention is not limited to what has been particularly shown and described hereinabove. Rather the scope of the present invention includes combinations and subcombinations of the various features described hereinabove as well as modifications and variations thereof which would occur to persons skilled in the art upon reading the foregoing description and which are not in the prior art.

The invention claimed is:

1. A payment terminal comprising:
a magnetic card reader;
a decoder receiving analog signals from said magnetic card reader and providing a digital data output to utilization circuitry; and
data integrity assurance circuitry including software operative to eliminate spurious data due to Electromagnetic Field (EMF) interference, said data integrity assurance circuitry sensing whether there are more than three card swipe reports within approximately 70 ms.

2. A payment terminal according to claim 1 and wherein said data integrity assurance circuitry is embodied in a processor employed in an operating system of said payment terminal.

3. A payment terminal according to claim 1 and wherein said data integrity assurance circuitry comprises data integrity verification circuitry receiving said digital data output from said decoder, verifying the integrity of said data output and providing a verified data output to said utilization circuitry.

4. A payment terminal according to claim 3 and wherein said data integrity verification circuitry includes software including at least one algorithm which rejects digital data having predetermined characteristics.

5. A payment terminal according to claim 4 and wherein said software in said data integrity verification circuitry includes software operative for detecting false swipe reports based both on the frequency of the reports and the content thereof.

6. A payment terminal according to claim 5 and wherein said software operative for detecting false swipe reports includes at least two of the following detection criteria:
a. There are more than three card swipe reports within approximately 70 ms,
b. More than a predetermined number of consecutive card swipe reports are considered not to contain any data; inasmuch as they either provide data having less than three characters on each of the three tracks or have an initial 0; and
c. A card swipe report indicates no data on each of the three tracks and the preceding card swipe report fulfilled either of criteria a or b above.

7. A method of operating a payment terminal including a magnetic card reader and a decoder, receiving analog signals from said magnetic card reader and providing a digital data output to utilization circuitry, the method comprising:
employing software to at least generally prevent spurious data due to Electromagnetic Field (EMF) interference from reaching said utilization circuitry, said employing including sensing whether there are more than three card swipe reports within approximately 70 ms.

8. A method of operating a payment terminal including a magnetic card reader and a decoder, receiving analog signals from said magnetic card reader and providing a digital data output, the method comprising:
receiving said digital data output, and employing software for verifying the integrity of said data output and providing a verified data output to utilization circuitry, thereby to eliminate spurious data due to Electromagnetic Field (EMF) interference, said employing including sensing whether there are more than three card swipe reports within approximately 70 ms.

9. A method of operating a payment terminal according to claim 8 and wherein said verifying employs a processor also employed in an operating system of said payment terminal.

10. A method of operating a payment terminal according to claim 8 and wherein said software for verifying includes at least one algorithm which rejects digital data having predetermined characteristics.

11. A method of operating a payment terminal according to claim 10 and wherein said software for verifying is operative to detect false swipe reports based both on the frequency of the reports and the content thereof.

12. A method of operating a payment terminal according to claim 11 and wherein said software for verifying includes at least two of the following detection criteria:
   a. There are more than three card swipe reports within approximately 70 ms;
   b. More than a predetermined number of consecutive card swipe reports are considered not to contain any data; inasmuch as they either provide data having less than three characters on each of the three tracks or have an initial 0; and
   c. A card swipe report indicates no data on each of the three tracks and the preceding card swipe report fulfilled either of criteria a or b above.

13. A method of operating a payment terminal including a magnetic card reader, a decoder receiving analog signals from said magnetic card reader and providing a digital data output, at least one magnetic card presence sensor and card presence responsive data integrity verification circuitry responsive to the presence or absence of an output from said at least one magnetic card presence sensor for confirming the occurrence of a card swipe and being operative to eliminate spurious data in the absence of a sensed card swipe occurrence, the method comprising:
   employing software to at least generally prevent spurious data due to Electromagnetic Field (EMF) interference from reaching utilization circuitry, said employing including sensing whether there are more than three card swipe reports within approximately 70 ms.

14. A method of operating a payment terminal according to claim 13 and wherein said software includes at least two of the following detection criteria for false swipes:
   a. There are more than three card swipe reports within approximately 70 ms;
   b. More than a predetermined number of consecutive card swipe reports are considered not to contain any data; inasmuch as they either provide data having less than three characters on each of the three tracks or have an initial 0; and
   c. A card swipe report indicates no data on each of the three tracks and the preceding card swipe report fulfilled either of criteria a or b above.

15. A method of operating a payment terminal including a magnetic card reader, a decoder receiving analog signals from said magnetic card reader and providing a digital data output, at least one magnetic card presence sensor and card presence responsive data integrity verification circuitry responsive to the presence or absence of an output from said at least one magnetic card presence sensor for confirming the occurrence of a card swipe and being operative to eliminate spurious data in the absence of a sensed card swipe occurrence, the method comprising:
   receiving said digital data output, and employing software for verifying the integrity of said data output and providing a verified data output to utilization circuitry, thereby to eliminate spurious data due to Electromagnetic Field (EMF) interference, said employing including sensing whether there are more than three card swipe reports within approximately 70 MS.

16. A method of operating a payment terminal according to claim 15 and wherein said verifying employs a processor also employed in an operating system of said payment terminal.

17. A method of operating a payment terminal according to claim 15 and wherein said software includes at least one algorithm which rejects digital data having predetermined characteristics.

18. A method of operating a payment terminal according to claim 17 and wherein said software is operative to detect false swipe reports based both on the frequency of the reports and the content thereof.

19. A method of operating a payment terminal according to claim 18 and wherein said software includes at least two of the following detection criteria for false swipes:
   a. There are more than three card swipe reports within approximately 70 ms,
   b. More than a predetermined number of consecutive card swipe reports are considered not to contain any data; inasmuch as they either provide data having less than three characters on each of the three tracks or have an initial 0; and
   c. A card swipe report indicates no data on each of the three tracks and the preceding card swipe report fulfilled either of criteria a or b above.

20. A method of operating a payment terminal according to claim 15 and wherein said software includes at least two of the following detection criteria:
   a. There are more than three card swipe reports within approximately 70 ms;
   b. More than a predetermined number of consecutive card swipe reports are considered not to contain any data; inasmuch as they either provide data having less than three characters on each of the three tracks or have an initial 0; and
   c. A card swipe report indicates no data on each of the three tracks and the preceding card swipe report fulfilled either of criteria a or b above.

\* \* \* \* \*